United States Patent [19]
Takahashi

[11] Patent Number: 5,923,822
[45] Date of Patent: Jul. 13, 1999

[54] IMAGE FORMING APPARATUS AND METHOD THEREFOR

[75] Inventor: Junji Takahashi, Ibaraki-ken, Japan

[73] Assignee: Riso Kagaku Corporation, Tokyo, Japan

[21] Appl. No.: 08/832,504

[22] Filed: Apr. 3, 1997

[30] Foreign Application Priority Data

Apr. 4, 1996 [JP] Japan .................................. 8-082681

[51] Int. Cl.⁶ ............................. G06K 9/00; G06F 15/00; G03F 3/08; H04N 1/46
[52] U.S. Cl. ......................... 395/109; 382/164; 358/518; 358/538
[58] Field of Search .................................... 395/109, 116; 382/165, 164; 250/318; 358/501, 518, 500, 296, 298, 300, 401, 515, 538, 530

[56] References Cited

U.S. PATENT DOCUMENTS 5,539,523  7/1996  Nakai et al. .............................. 382/165
5,578,824 11/1996  Koguchi et al. ......................... 250/318

FOREIGN PATENT DOCUMENTS 07137349  5/1995  Japan ............................... H04N 1/23

*Primary Examiner*—Thomas D. Lee
*Assistant Examiner*—Wenpeng Chen
*Attorney, Agent, or Firm*—Kanesaka & Takeuchi

[57] ABSTRACT

An image forming apparatus for forming a color printed image on a color image forming sheet provided with a color area having plural kinds of colors arranged in a predetermined pattern, is formed of a display device for displaying an image, an area designating device for designating an area of at least a part of the images displayed on the display device, and a printing device for printing the image on the color image forming sheet. Thus, the region designated by the area designating device appears as a designated pattern corresponding to a pattern of a color area of the color image forming sheet.

9 Claims, 12 Drawing Sheets

FIG. 3

(Diagram rotated 90°; content described as a table:)

| PATTERN SHAPE (STRIPE) | | LINE KIND | | COLOR |
|---|---|---|---|---|
| LINE WIDTH | SPACING | PARALLEL LINE | OBLIQUE LINE | |

Color swatches: BLACK, BLUE, RED, WHITE, GREEN, YELLOW

Oblique Line ANGLE: 0°, 5°, 10°, 15°, 20°, 25°, 30°, 35°

RIGHT-OBLIQUE: SOLID LINE, BROKEN LINE
LEFT-OBLIQUE: SOLID LINE, BROKEN LINE

PARALLEL LINE: SOLID LINE, BROKEN LINE

D { D1, D2, D3 }

11

IMAGE FORMING APPARATUS AND METHOD THEREFOR

BACKGROUND OF THE INVENTION

1. Field of the Invention

The present invention relates to an image forming apparatus and method therefor, in which a processing apparatus such as a personal computer, and a printing/stencil making apparatus such as a printer, a word processor, a processing machine and the like are used to directly form a desired image on a color image forming sheet having a color area of a plurality of colors formed in advance regularly, or to perform heat-sensitive perforation by a desired image on a screen base paper to form an image on a color image forming sheet by a screen press using the screen base paper subjected to heat-sensitive processing.

2. Description of the Related Art

For the purpose of obtaining a desired color image by a handy means, the present applicant has proposed a color image forming sheet having a color area regularly constituted by a plurality of colors (Japanese Patent Laid-Open No. 137349/1995).

The color image forming sheet is a sheet in which inks of three primary colors comprising cyan (C), magenta (M) and yellow (Y) are printed in a predetermined type on a sheet-like substrate such as paper.

As the predetermined type of the color image forming sheet 11, there is employed a stripe pattern in which color inks are printed in the constant order alternately without clearance so as to form stripes each having a predetermined width, as shown in an enlarged view of FIG. 11. With this, the color image forming sheet 11 appears to be the ground color of a gray base such as black or gray as a whole by a mixture of colors. Alternatively, the color image forming sheet 11 with the ground color such as a cream base, a green base, a pink base and the like as a whole is obtained by combining colors different in reflecting concentration in the color areas.

When the printing width of each stripe is, for example, 0.1 to 0.22 mm, each color is repeated with a pitch of 0.3 to 0.66 mm.

If, for example, white ink is placed on a part of the color image forming sheet 11 for printing, ink in a portion remaining without being covered is mixed in color to form a constant color. For example, as shown in FIG. 12, if only a portion of yellow Y of the color image forming sheet 11 is concealed by white ink in a web-like manner, the color image forming sheet 11 appears to be blue (or purple) as a whole by a mixture of remaining cyan C and magenta M.

Further, as shown in FIG. 13, if white ink is printed in a web-like manner on a part of yellow Y and the whole cyan C of the color image forming sheet 11, the color image forming sheet 11 appears to be red as a whole by a mixture of a part of yellow Y and magenta M remained.

As described above, a part of the color image forming sheet 11 is covered with a predetermined pattern by changing a line width and a spacing of the pattern according to the line width and the spacing of color areas in the color image forming sheet 11 whereby a desired color image can be represented by a mixture of the ground colors not concealed.

A predetermined pattern covering a part of the color image forming sheet 11 is formed in a stencil sheet by heat-sensitive boring, and a desired color image is formed on the color image forming sheet 11 using the stencil sheet thus heat-sensitively perforated. Then, a desired color can be displayed on the color image forming sheet 11 as described above. In the case where a color is displayed on the color image forming sheet by printing using a perforated stencil sheet, as described above, the processing procedure generally contemplated will be described below.

For this treatment, there is used a film-like transparent sheet formed on the whole surface thereof with white stripes having a predetermined line width and spacing. The transparent sheet is set in the line width and spacing of the stripes according to which a part of color areas of the color image forming sheet is covered. Plural kinds of transparent sheets different in the line width and spacing are prepared.

First, a suitable sheet is selected out of the plural kinds of transparent sheets according to the line width and spacing of the stripes of the color image forming sheet on which an image is printed. This single transparent sheet is placed over the whole surface of a sheet on which an original image is depicted and copied by a copier. The obtained copy is a stripe-like image in which a portion on which white color of the transparent sheet is in the form of white. Next, only a necessary figure is cut out of the copied sheet, which is edited by a combination thereof with other figures if necessary and affixed to a suitable sheet to copy it again, thus obtaining an original. A stencil sheet is perforated by the heat-sensitive perforation using the aforesaid original. By using the thus perforated stencil sheet, printing is carried out relative to the color image forming sheet by the printing/stencil making apparatus.

In addition to the aforementioned processing, the following method may be contemplated. An original on which the original image itself is formed in advance in a stripe-like form is prepared. The heat-sensitive perforation is applied to a stencil sheet by the aforesaid original, and printing is carried out relative to the color image forming sheet using the thus perforated stencil sheet.

If the perforated stencil sheet obtained as described above is used, ink transferred from the perforated portion of the stencil sheet covers a part of a color area of the color image forming sheet. A desired color image is formed on the color image forming sheet by a mixture of colors not concealing the color area.

However, in the aforementioned method, it is necessary to prepare plural kinds of transparent sheets on which stripes different in the line width and spacing for forming an image on a stencil sheet and to take a copy using the transparent sheet selected therefrom. This poses a problem in that many materials such as transparent sheets and sheets for copying are consumed. Moreover, since most of work are manually done, the work itself was cumbersome. In addition, in the method of using an original in which the original image itself is formed in advance in a stripe-like form, a color pattern depicted on the color image forming sheet tends to be fixed, thus making it difficult to expand the width of an expressive power.

SUMMARY OF THE INVENTION

The present invention has been achieved in view of the aforementioned problem. It is an object of the present invention to provide an image forming apparatus and method therefor in which conventional cumbersome works such as copying operation of transparent sheets, perforation using a flash lamp and the like, and a burden imposed on an operator can be extensively relieved to shorten the entire treating time, and the expression by colors depicted on the color image forming sheet can be enhanced.

An image forming apparatus according to a first aspect is an image forming apparatus for forming a color image on a color image forming sheet provided with a color area comprising plural kinds of colors arranged in a predetermined pattern, comprising a display means for displaying an image, an area designating means for designating a region of at least a part of said images displayed on the display means, and a printing means for printing the image on the color image forming sheet so that the region designated by the area designating means appears as a designated pattern corresponding to a pattern of a color area of the color image forming sheet.

An image forming apparatus according to a second aspect is an image forming apparatus for forming a color printed image using a perforated stencil sheet on a color image forming sheet provided with a color area comprising plural kinds of colors arranged in a predetermined pattern, comprising a display means for displaying an image, an area designating means for designating a region of at least a part of said images displayed on the display means, and a perforating means for perforating the image on the stencil sheet so that the region designated by the area designating means appears as a designated pattern corresponding to a pattern of a color area of the color image forming sheet.

An image forming apparatus according to a third aspect is based on the image forming apparatus according to the first aspect, wherein the display means displays plural kinds of pattern information for defining the interior of the region designated by the area designating means, and a desired pattern is designated from the pattern information whereby the designated pattern for defining the interior of the region designated by the area designating means is selected.

An image forming apparatus according to a fourth aspect is based on the image forming apparatus according to the third aspect, wherein the pattern information comprises information of a line width of a stripe, a spacing of a stripe, a line kind, and color.

An image forming apparatus according to a fifth aspect is based on the image forming apparatus according to the third or fourth aspect, further comprising a control means for processing image data according to a pattern designated out of the pattern information.

An image forming apparatus according to a sixth aspect is based on the image forming apparatus according to the fifth aspect, wherein the control means comprises a pattern developing means and a logical operating means. The pattern developing means sets a memory work area for one image plane in a designated pattern out of the pattern information to place a figure representative of an external form of the region designated by the area designating means in the memory work area. The logical operating means writes in the image a figure of the designated region placed in the memory work area by the pattern developing means and a figure obtained by the logic product relative to the designated pattern.

An image forming method according to a seventh aspect is an image forming method for forming a color image on a color image forming sheet provided with a color area comprising plural kinds of colors arranged in a predetermined pattern, said method comprising the steps of; displaying an image data, designing an area in said image data, processing said image data so that said area is expressed with a designated pattern relative to said predetermined pattern, and printing said processed image data onto said color image forming sheet.

An image forming method according to an eighth aspect is an image forming method for forming a color image using a perforated stencil sheet on a color image forming sheet provided with a color area comprising plural kinds of colors arranged in a predetermined pattern, said method comprising the steps of; displaying an image data, designing an area in said image data, processing said image data so that said area is expressed with a designated pattern relative to said predetermined pattern, and perforating said processed image data onto said stencil sheet.

According to the present invention, it is possible to form a desired color image on the color image forming sheet merely by suitably designating a region to be processed in color in the image displayed on a display unit. In this case, a pattern for covering a color area of the color image forming sheet in a designated region of the image is selectively designated according to a line width, a spacing and the like of the color area whereby an expression of color appearing in the color image forming sheet can be enhanced.

The pattern information for defining a pattern of the designated region includes stripe patterns in the form of solid lines and broken lines comprising parallel lines and oblique lines, and dots. The kinds of colors appearing on the color image forming sheet can be increased by changing a tone of dots, and a center spacing.

BRIEF DESCRIPTION OF THE DRAWINGS

FIG. 3 is a view showing one example of pattern information selected by a manual input section of the image forming apparatus;

DETAILED DESCRIPTION OF THE PREFERRED EMBODIMENTS

Figure 1:
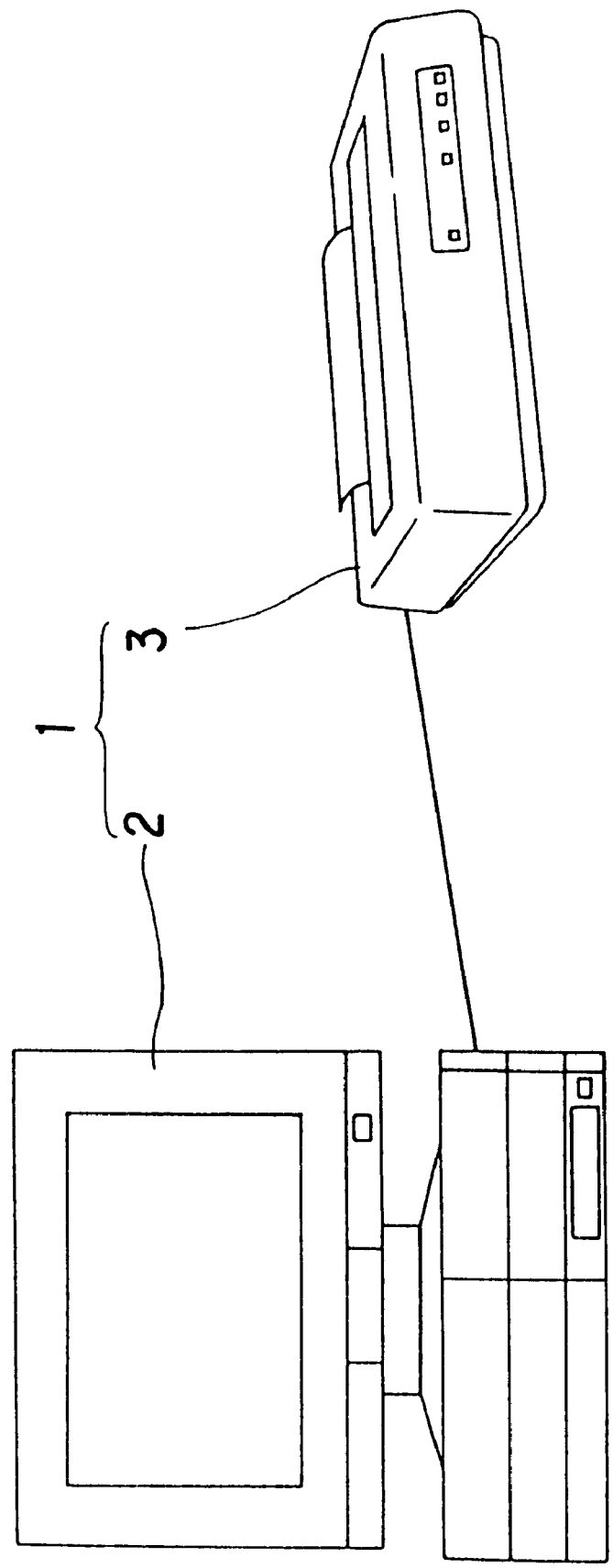
FIG. 1 is a view showing the entire constitution of an image forming apparatus according to the present invention.
Figure 2:
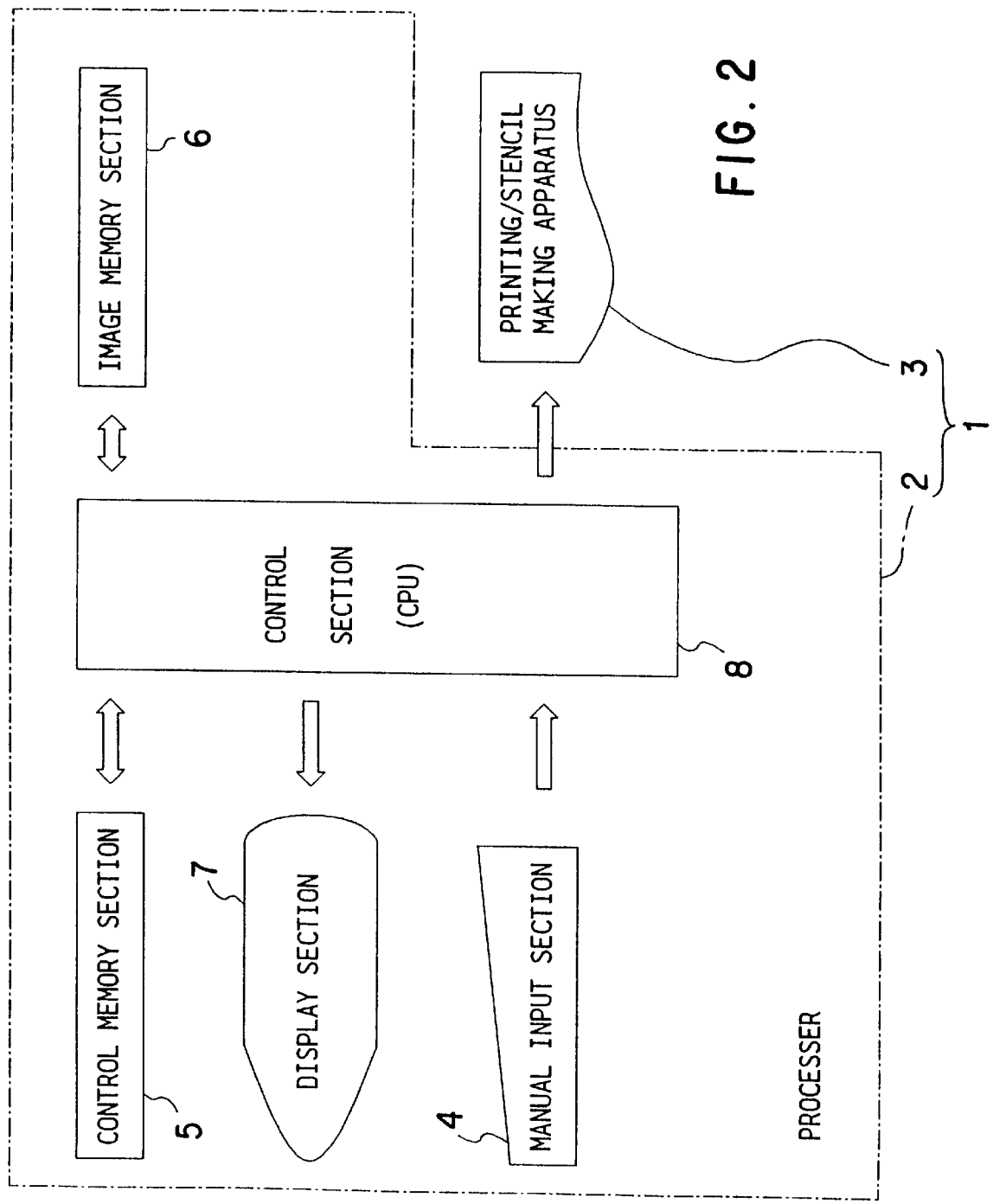
FIG. 2 is a block diagram schematically showing the image forming apparatus.

FIG. 1 is a view showing the entire constitution of an image forming apparatus according to the present invention; and FIG. 2 is a block diagram schematically showing the image forming apparatus.

Figure 11:
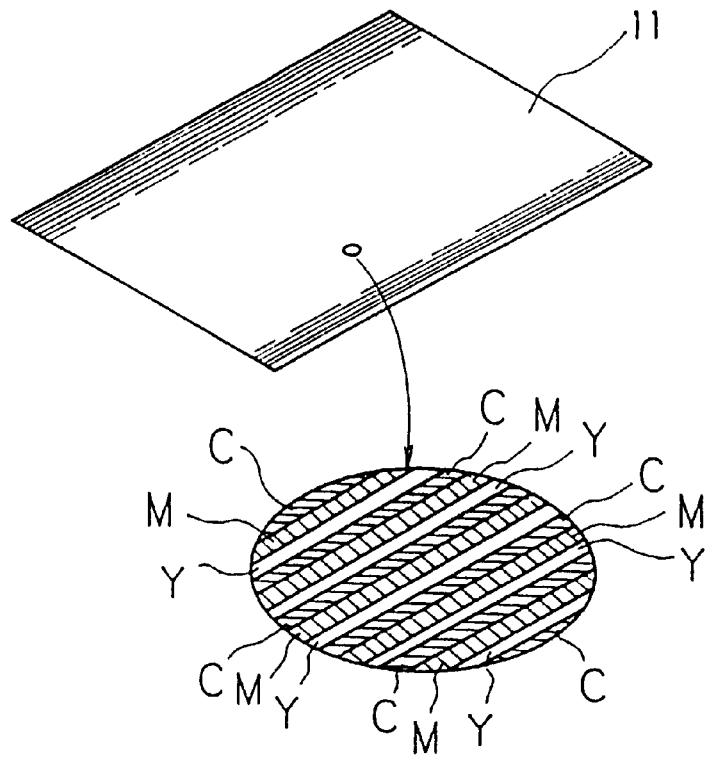
FIG. 11 is a perspective view showing a color image forming sheet and its partial enlarged view.
Figure 12:
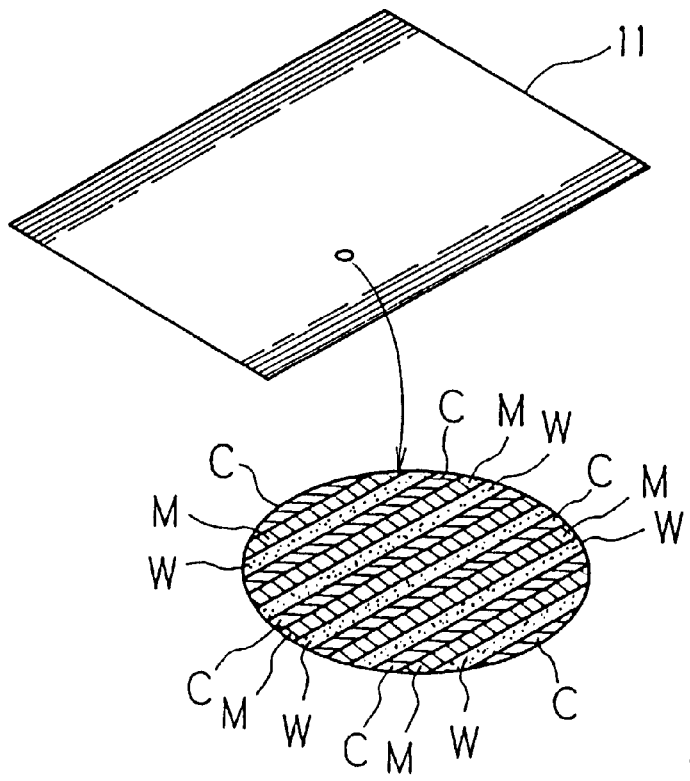
FIG. 12 is a perspective view showing one example of a state in which print is made on a part of the color image forming sheet, and its partial enlarged view.
Figure 13:
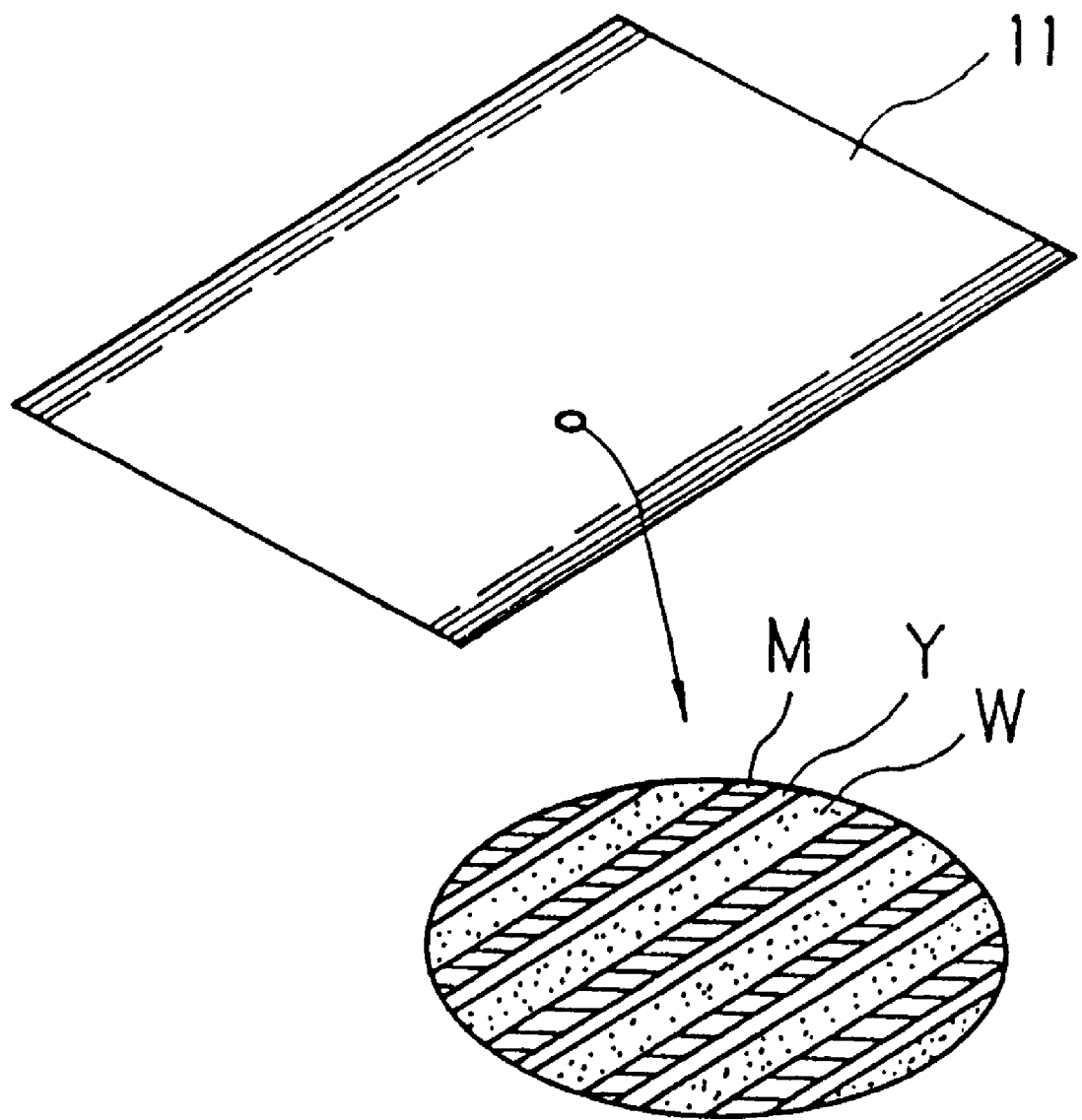
FIG. 13 is a perspective view showing one example of a state in which print is made on a part of the color image forming sheet, and its partial enlarged view.

As shown in FIG. 1, an image forming apparatus 1 schematically comprises a processor 2 constituted by a computer such as a personal computer, and a printing/stencil making apparatus 3 electrically connected to the processor 2 through a cable. In the image forming apparatus 1, a desired image is printed on a color image forming sheet 11 (FIG. 11-B) by output data obtained by the processor 2.

The color image forming sheet is a sheet in which inks of three primary colors comprising cyan (C), magenta (M) and yellow (Y) are printed in a predetermined type on a sheet-like substrate such as paper, as described previously in column of "Related Art", details of which are not repeated.

Inks used for printing color areas of the color image forming sheet 11 are not limited to the primary colors of cyan C, magenta M and yellow Y. Also, the kinds of colors of inks are not limited to the above three kinds but plural kinds thereof may be used.

In the present embodiment, if printing is carried out relatively to a predetermined area of the color image forming sheet 11 by white ink in a predetermined pattern, color in a color area not covered with white ink is mixed in color and a predetermined color should appear in the color image forming sheet 11. However, a stripe of color constituting a color area of the color image forming sheet 11 cannot be made completely parallel with a stripe of white ink by printing. Therefore, the color area from which a stripe is concealed is not constant but changes in a longitudinal direction of the stripe. Accordingly, the color of the color image forming sheet 11 also gradually changes in a longitudinal direction of the stripe, which creates the visual effect like rainbow-color. In the present specification, the processing for creating the visual effect like rainbow in an image will be hereinafter referred to as "Rainbow-color forming process".

As shown in FIG. 2, the processor 2 comprises a manual input section 4, a control memory section 5, an image memory section 6, a display section 7 and a control section (CPU) 8.

Figure 4:
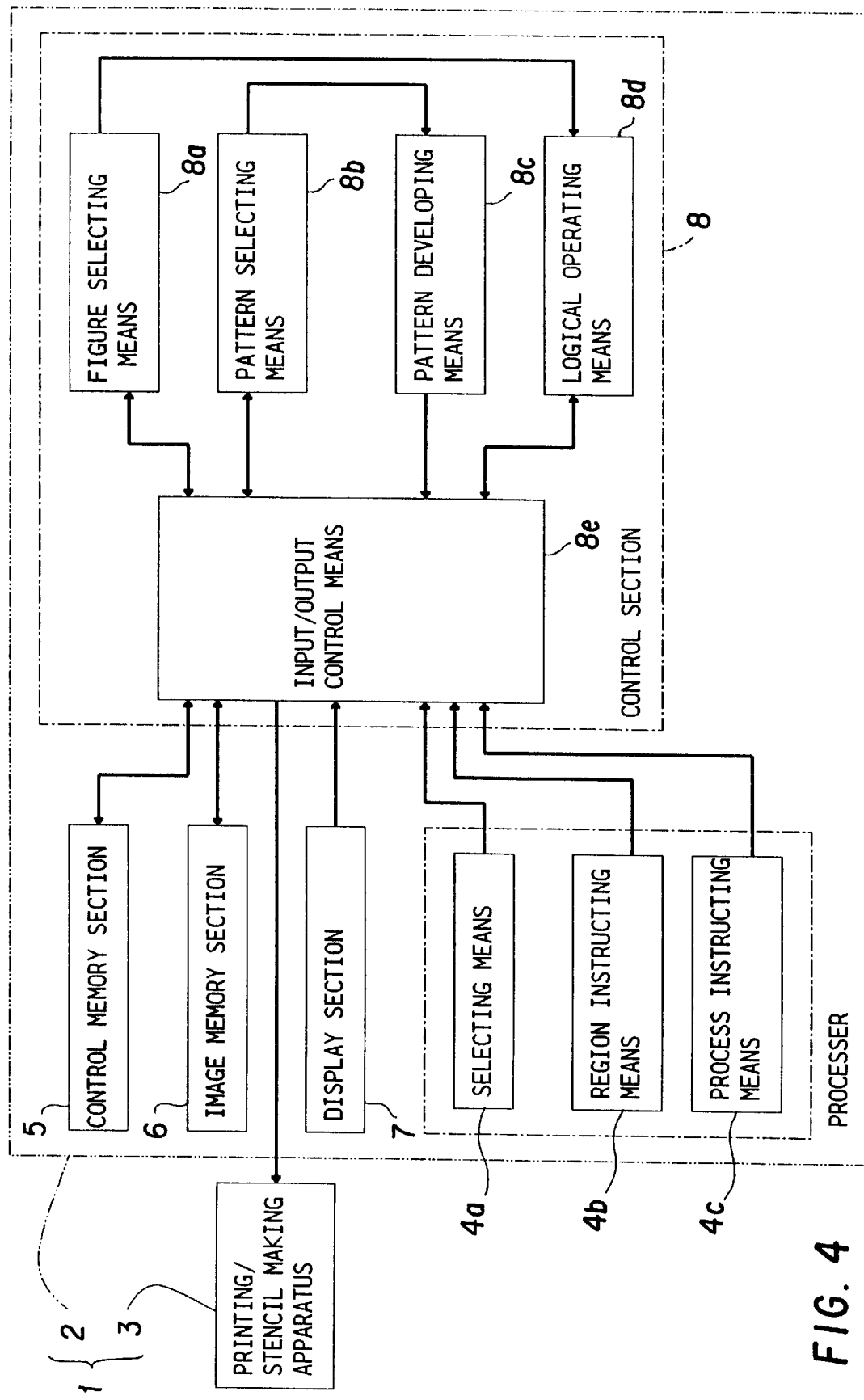
FIG. 4 is a detailed functional block diagram of the image forming apparatus.
Figure 5A:
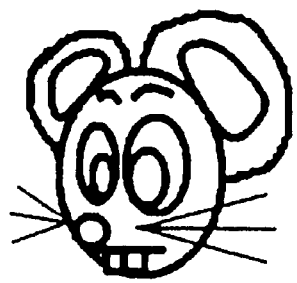
FIGS. 5(a)–5(f) are views of an image showing the progress in which an image is processed into a rainbow-colored image by the image forming apparatus and then a desired image is printed on a color image forming sheet.
Figure 5D:
Figure 5B:
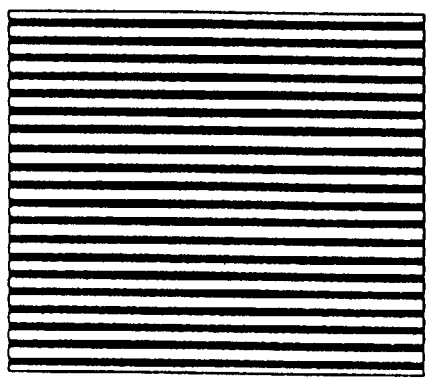
Figure 5E:
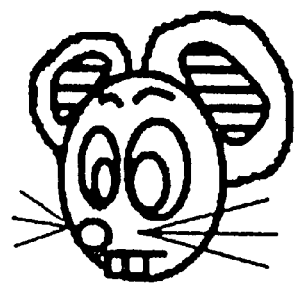
Figure 5C:
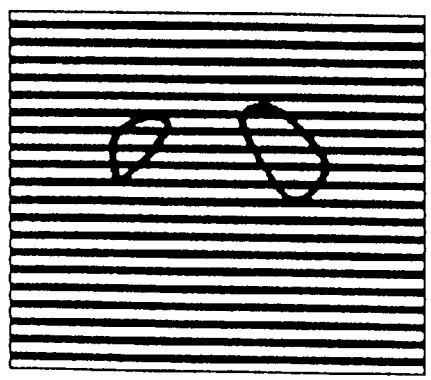
Figure 5F:
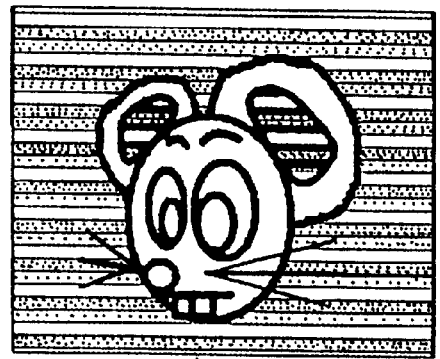

As shown in FIG. 4, the manual input section 4 comprises, for example, a keyboard, a mouse and the like, and provides the selection and instructions of the processing for the control section 8 by manual input. The manual input section 4 comprises a selection means 4a, an area designating means 4b, and a process instructing means 4c.

The selection means 4a performs the selection of the rainbow-color forming process mode for the rainbow-color forming process of image data read, the selection of parameters of pattern information displayed at the time of the rainbow-color forming mode, the selection of the printing process mode for printing a desired image on the color image forming sheet 11 by a printing/stencil making apparatus 3, and the selection of the processing mode for processing a desired image on a stencil sheet by the printing/stencil making apparatus 3.

The area designating means 4b performs the designation of a region for rainbow-color processing a figure displayed at the time of the rainbow-color processing mode. The process instructing means 4c performs the instructions for reading image data to be processed from the image memory section 6 to display it on the display section 7, the instructions of the number when printing, and the instructions of the number of plates when processing.

The control memory section 5 stores therein the entire sequence program for executing a series of operations in the processor 2, and pattern information D used at the time of the rainbow-color forming process.

One example of the pattern information D is shown in FIG. 3. The pattern information D is displayed on the display image plane of the display section 7 when the rainbow-color processing mode is selected by the selection means 4a of the manual input section 4, and is roughly divided into a pattern shape D1, a line kind D2 and a color D3.

In the illustrated embodiment, the pattern shape D represented by stripes is divided into a line width and a spacing, plural kinds of which (3 kinds in the illustrated example) are stored. The line kind D2 is divided into a parallel line parallel with a scanning direction of the display section 7, and an oblique line inclined at a predetermined angle with respect to the scanning direction of the display section 7. The parallel line is further divided into solid lines and broken lines. The oblique line has plural kinds of angles (in the illustrated example, every five degrees in the range of 0 to 35°, by which the rainbow-color effect can be expected) and divided into the right oblique line and the left oblique line indicating the oblique direction of angles, and the right oblique line and the left oblique line are further divided into solid lines and broken lines. The color D3 stores therein color information of patterns to be printed, plural kinds of which (in the illustrated example, 6 colors, black, blue, red, yellow, green and white) are stored. In the pattern information D, at the time of the rainbow-color processing mode, the designation of the pattern shape D1 (line width, spacing), the line kind D2 (selection of parallel line or oblique line; in case of the parallel line, selection of solid line or broken line; and in case of oblique line, selection of its angle and oblique direction, selection of solid line or broken line), and the color D3 is accomplished by the selecting means 4a of the manual input section 4.

The image memory section 6 stores therein image data to be the original image to be edited. The image data include, for example, line images, illustrations, figures and the like, which are obtained by the preparation on the image plane by operation of the manual input section 4, and the reading by an image reading apparatus such as an image scanner and a CCD camera not shown. The image memory section 6 stores therein data showing the edited results of figures processed by the control section 8.

The display section 7 performs various displays such as the display of figures by image data to be edited, the display of the pattern information D at the time of the rainbow-color forming process, and the progress of the processing executed by the control section 8 at the time of the rainbow-color forming process.

The control section 8 performs the exchange of data between it and the image memory section 6 when the rainbow-color forming process mode is selected by the manual input section 4 in accordance with the sequence program of the control memory section 5, the output of data to the display section 7 on the basis of the selection by the manual input section 4, and the output of data to the printing/stencil making apparatus 3 when the printing/stencil making mode is selected by the manual input section 4.

As shown in FIG. 4, the control section 8 comprises a figure selecting means 8a, a pattern selecting means 8b, a pattern developing means 8c, a logic calculating means 4d, and an input/output control means 8e.

The figure selecting means 8a sets, as a selected figure, a figure (a closed region) of a portion subjected to the rainbow-color forming process designated by the area designating means 4b of the manual input section 4, and stores the selected figure in the image memory section 6 to output it to the pattern developing means 8c. Further, the figure selecting means 8a changes, when the figure of the portion subjected to the rainbow-color forming process is designated by the area designating means 4b, the display expression so that the designated figure can be confirmed. More specifically, the designated figure is turned on and off, or the outer frame of the figure is made thicker as compared with other figures. In case the display section 7 is constituted to provide a color display, color of the designated figure is changed.

The pattern selecting means 8b stores, in the pattern information D read from the control memory section 5 at the time of the rainbow-color forming mode and displayed on the display section 7, data of parameters D1 to D3 of the pattern information D selected and designated by the selecting means 4a of the manual input section 4, and outputs it to the pattern developing means 8c. The pattern selecting means 8b changes, when the parameters D1 to D3 of the pattern information D shown in FIG. 3 are selected and designated by the selecting means 4a, the display expression so that the designated parameters D1 to D3 can be confirmed. More specifically, the designated parameter is turned on and off, or the outer frame of the parameter is made thicker than other parameters.

The pattern developing means 8c writes a main work area (FIG. 5 (b)) for one image plane portion in the display section 7 in a pattern according to data of the parameters D1 to D3 of the pattern information D input from the pattern selecting means 8b. Further, the data of the selected figure input from the figure selecting means 8a is placed over and displayed in the memory work area on the display image plane of the display section 7 to develop the figure subjected to the rainbow-color forming process.

The logical operating means 8d provides the logic product of a figure (FIG. 5 (a)) developed by the pattern developing means 8c and a pattern (FIG. 5 (b)) on the basis of the pattern information D selected by the pattern selecting means 8b. A figure obtained by the logic product of the developed figure and the pattern is written into the frame of the original figure (original image).

More specifically, a developed figure and a pattern are expressed as binary data of [0] and [1]. In the example, all the data within a closed region inside ear in the form of a developed figure and other portions are processed as [1] and [0], respectively. Further, a portion in which a pattern on the basis of the pattern information D is present and a portion in which it is not present are processed as [1] and [0], respectively. The logic product of the developed figure and the pattern expressed by [0] and [1], respectively is taken to thereby obtain a figure (FIG. 5 (d)) in which a pattern is present within the closed region inside an ear. The figure obtained by the logic product is written into the frame of the original figure (the original image).

The input/output control means 8e reads image data from the image memory section 6 on the basis of the manual input section 4, to control the input and output of data in various parts such as the display of image data on the display section 7, the writing of data of the selected figure and the pattern information D into the image memory section 6 at the time of the rainbow-color forming process mode, the pattern development of the figure on the basis of the selected figure and the pattern information D, and the output of data with respect to the printing/stencil making apparatus 3.

The printing/stencil making apparatus 3 has a thermal head as a printing means, for example, and is composed of a thermal transfer type printer and a word processor on which a transfer ribbon is mounted when printing, a color ink jet type printer or a word processor, a laser printer, etc.

The printing/stencil making apparatus 3 may be a stencil printing machine in which a stencil making and a printing section are integrated.

The printing/stencil making apparatus 3 directly prints an image on the color image forming sheet 11 on the basis of data transferred from the image memory section 6 by control of the control section 6 when the printing processing mode is selected by the selecting means 4a of the manual input section 4. At that time, for the printing/stencil making apparatus 3, there can be used a thermal transfer type printer and a word processor, a color ink jet type printer or a word processor, a laser printer, and a stencil printing machine.

This will be described further. When the thermal transfer type printer or a word processor is used as the printing/stencil making apparatus 3, first, a transfer ribbon capable of printing color designated by the manual input section is mounted. More specifically, when an image is printed in white, a transfer ribbon for white only is mounted. When an image is printed in colors other than white, a full color (including black) transfer ribbon is mounted. Thereafter, the color image forming sheet 11 is set to a predetermined position for printing. Thereby, an image of a desired pattern is directly printed on the color image forming sheet When a color ink jet type printer or a word processor and a laser printer are used as the printing/stencil making apparatus 3, the color image forming sheet 11 is set to a predetermined position for printing, whereby an image of a desired pattern is directly printed on the color image forming sheet 11.

When a stencil printing machine is used as the printing/stencil making apparatus 3, a printing drum having printing ink of color capable of printing color designated by the manual input section 4 received therein is mounted on the apparatus body. Thereafter, the color image forming sheet 11 is set to a predetermined position for printing. Thereby, an image of a desired pattern is directly printed on the color image forming sheet 11.

Data transferred from the image memory section 6 when printing takes place comprise image data, the number of prints on the basis of the pattern information D.

Figure 6:
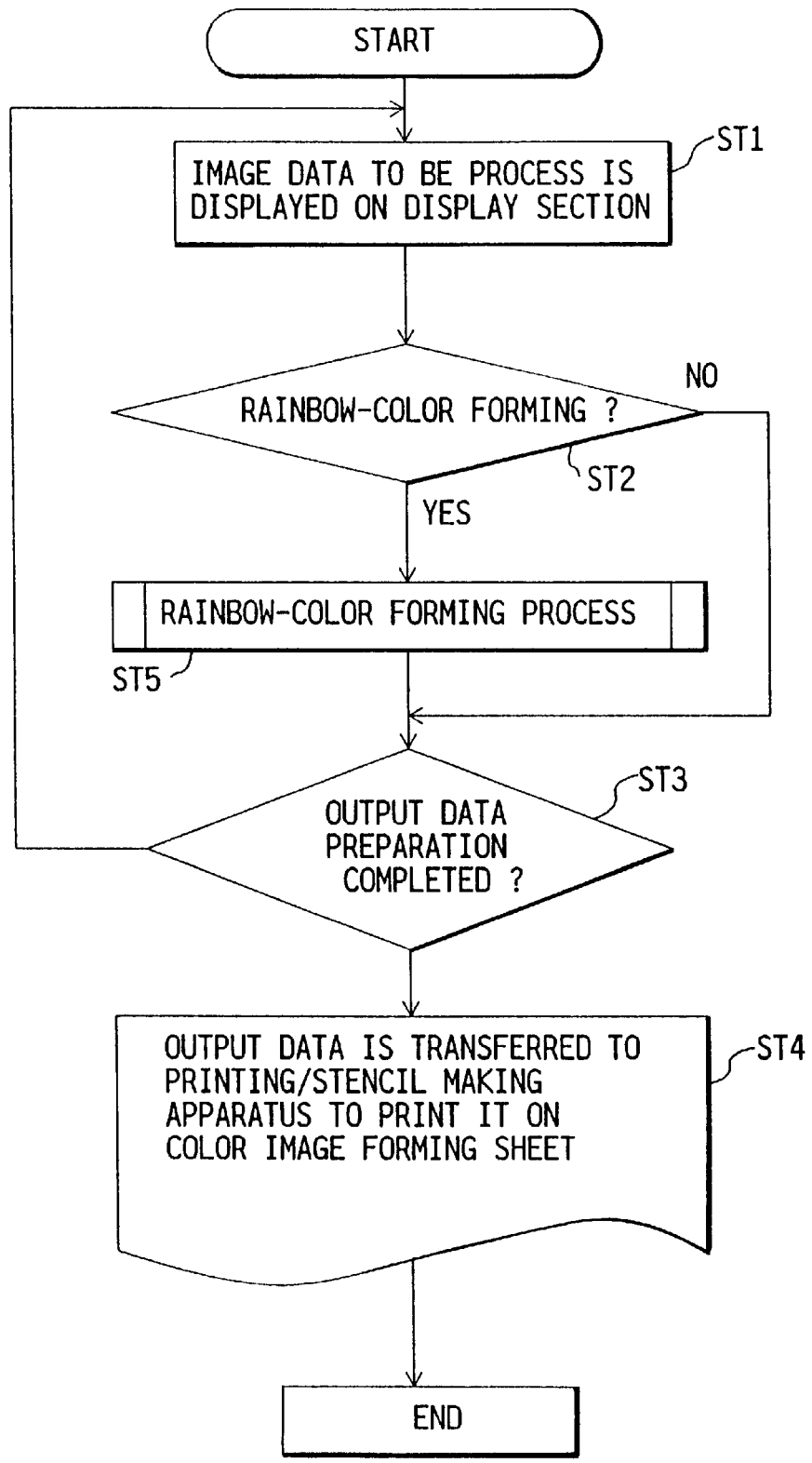
FIG. 6 is a flow chart showing a series of operation by the image forming apparatus.
Figure 7:
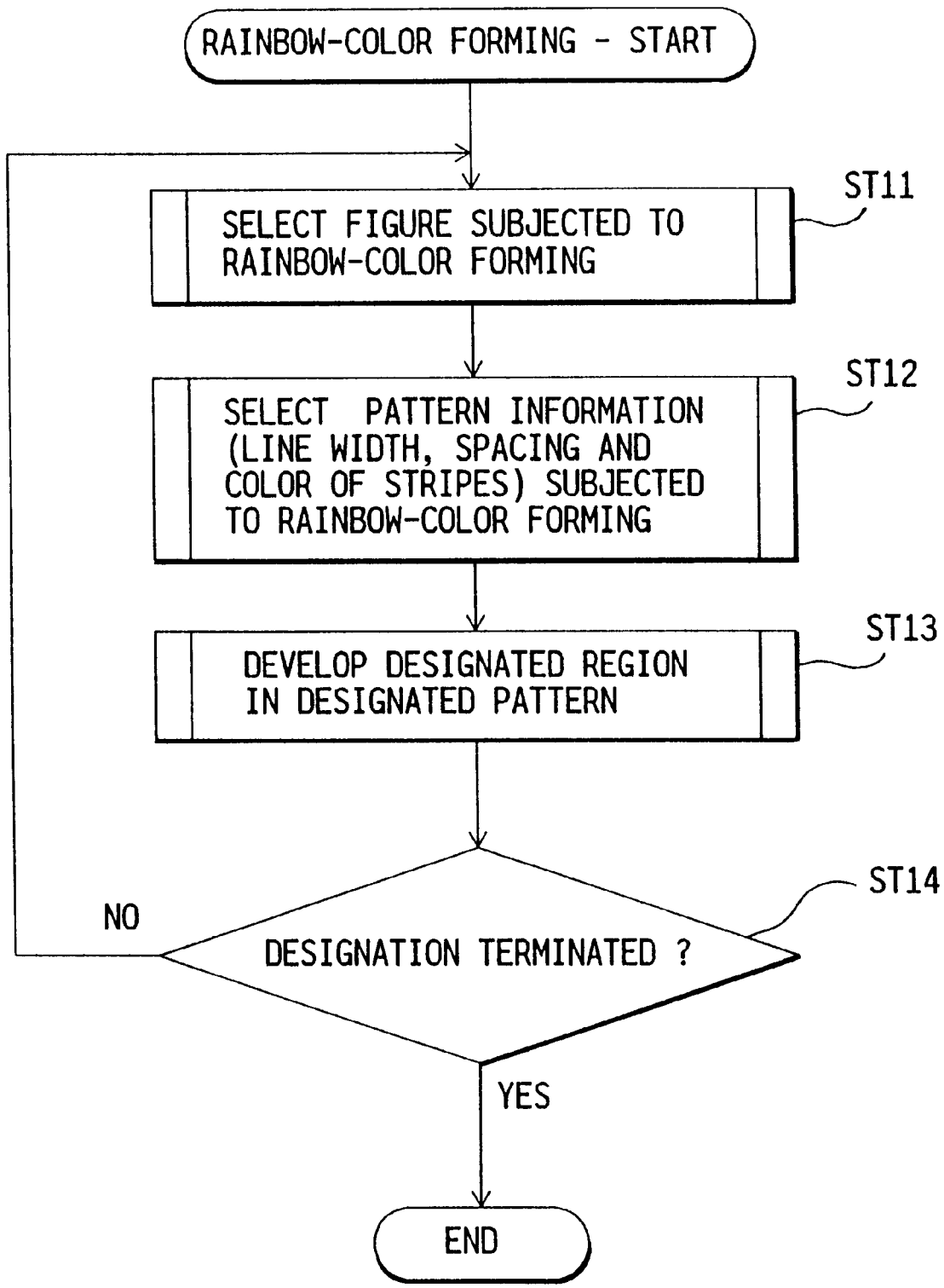
FIG. 7 is a flow chart showing the operation of the rainbow-color forming process.
Figure 8:
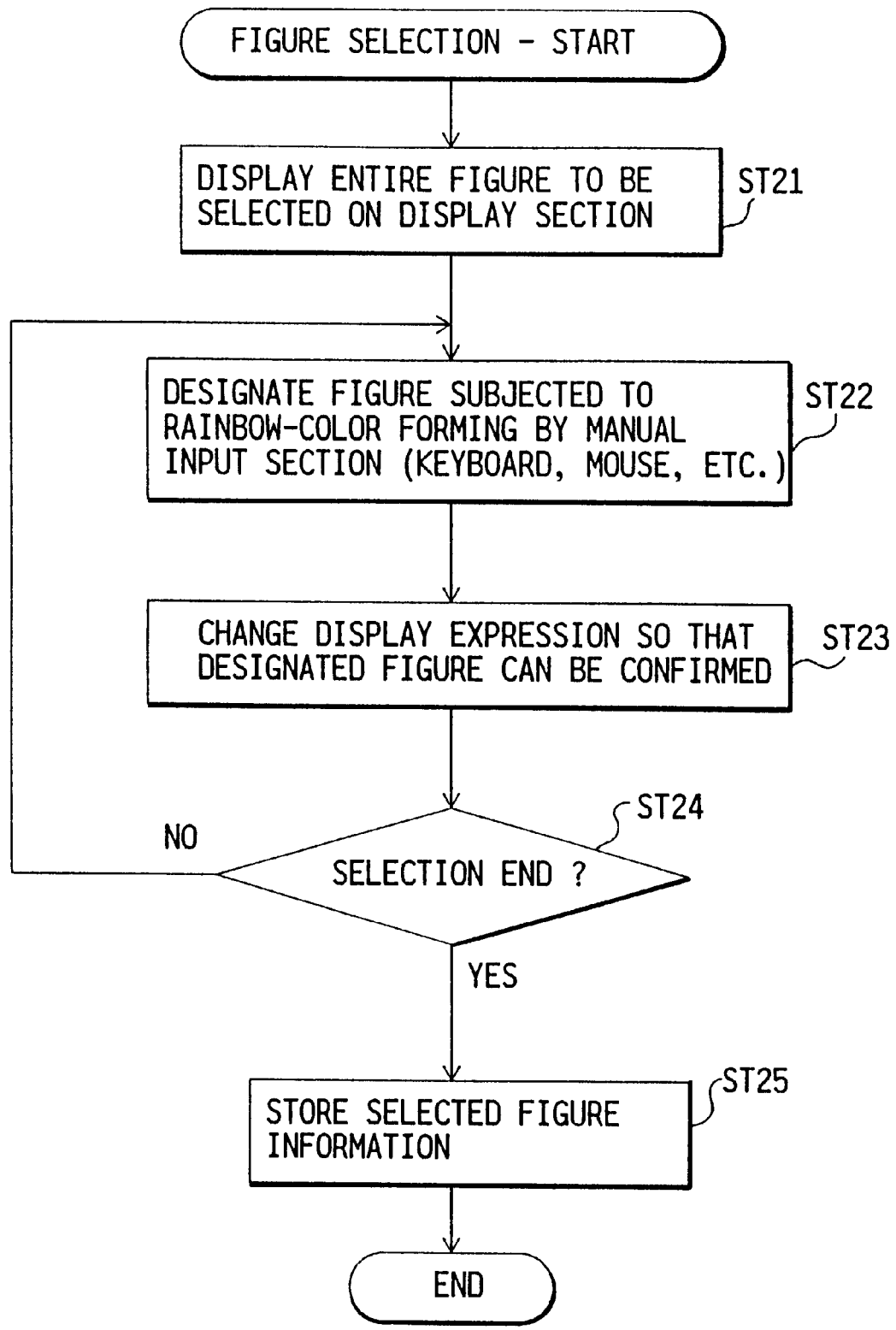
FIG. 8 is a flow chart of a figure selection processing operation in the rainbow-color forming process.
Figure 9:
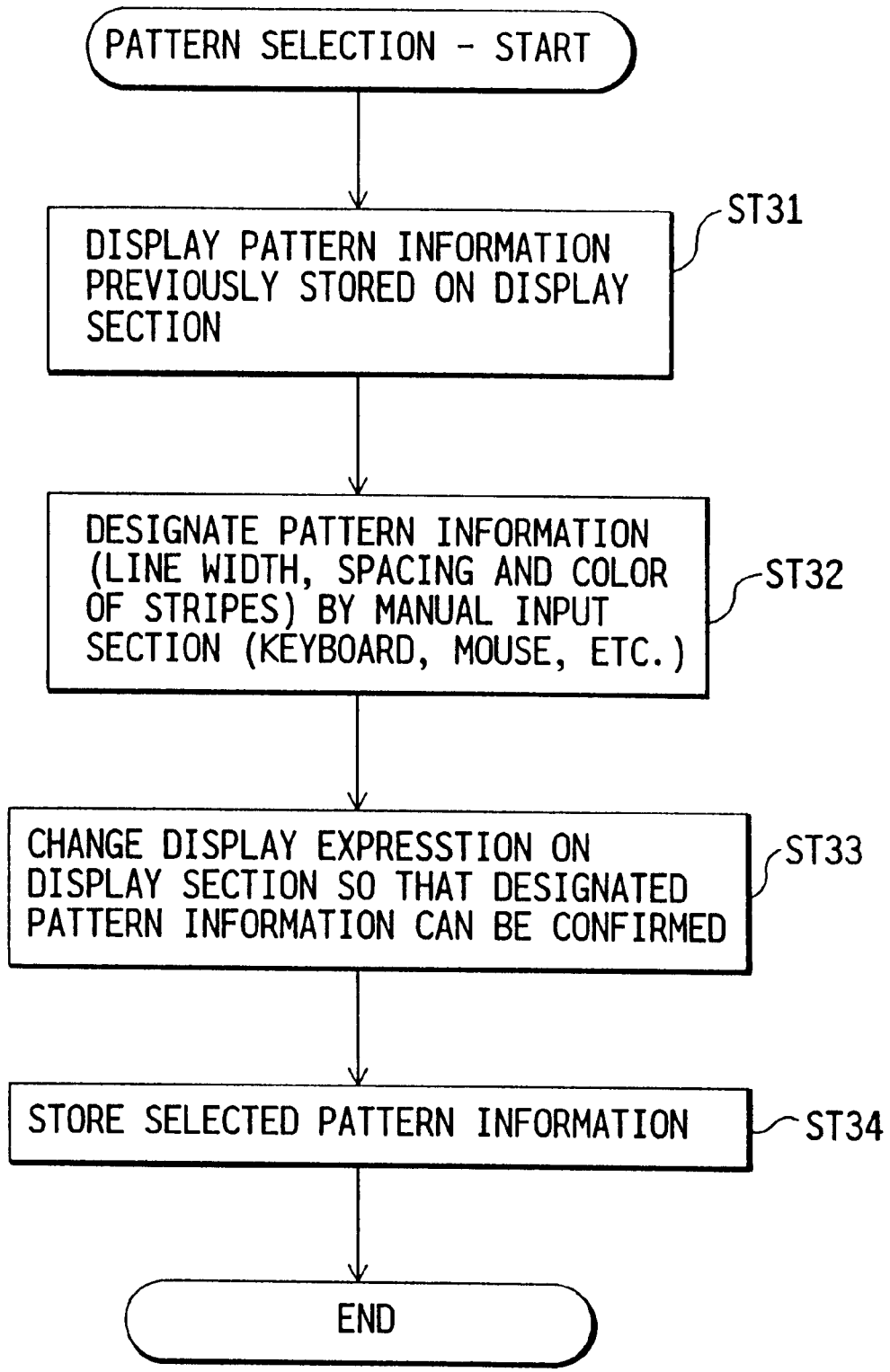
FIG. 9 is a flow chart of a pattern selection processing operation in the rainbow-color forming process.
Figure 10:
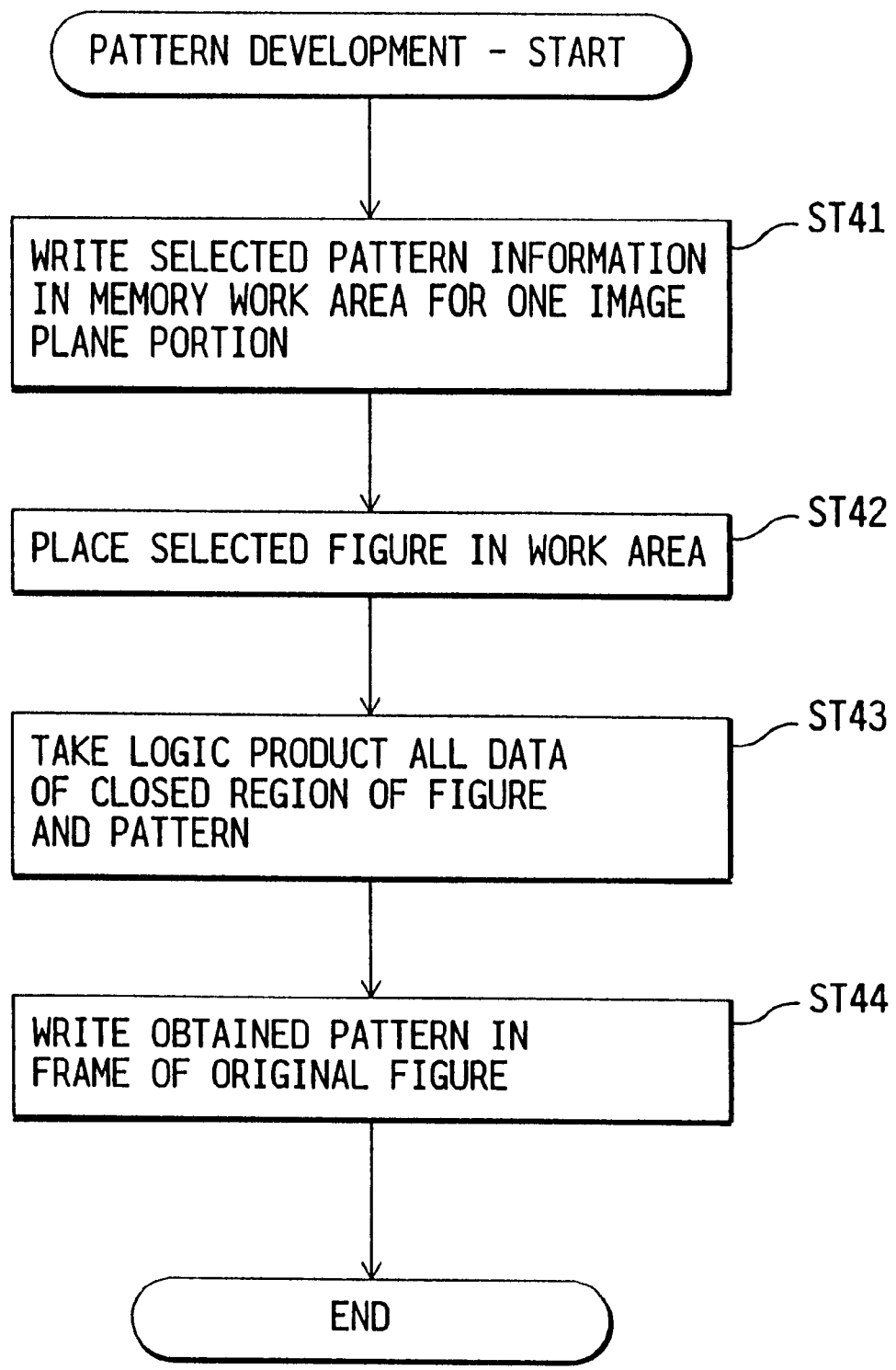
FIG. 10 is a flow chart of a pattern development processing operation in the rainbow-color forming process.

A series of processing procedures by the image forming apparatus constructed as described above will be described hereinafter with reference to flow charts of FIGS. 6 to 10. FIG. 6 is a flow chart showing a series of operation by the image forming apparatus; FIG. 7 is a flow chart showing the operation of the rainbow-color forming process; FIG. 8 is a flow chart of figure selection processing operation in the rainbow-color forming process; FIG. 9 is a flow chart of pattern selection processing operation in the rainbow-color forming process; and FIG. 10 is a flow chart of pattern development processing operation in the rainbow-color forming process.

First, image data to be processed (an image of a mouse shown in FIG. 5 (a)) are read from the image memory section 6 to display it on the display section 7 (ST1). This image to be processed may be prepared on the display image plane of the display section 7 making use of a depicting function. When the preparation of output data is completed (ST3—Yes) without rainbow-color formation (ST2—No), for example, an image of a mouse is transferred as output data to the printing/stencil making apparatus 3, and the image of a mouse by the output data is printed on the color image forming sheet 11 (ST4).

In case of the rainbow-color formation, the rainbow-color forming process shown in FIG. 7 is executed. Here, a location of a figure subjected to the rainbow-color forming process is a closed region inside an ear of a mouse. In the rainbow-color forming process, first, a figure subjected to the rainbow-color forming process is selected (ST1), and the figure selecting process shown in FIG. 8 is executed. In the figure selecting process, a figure to be processed or the entire figure of a mouse is displayed on the display section 7 (ST21).

Next, a figure of a portion subjected to the rainbow-color forming process or a closed region of inside ear is designated in point by the selecting means 4a of the manual input section 4 (ST22). If this designation is not effected, the figure selecting means 8a changes the display expression on the display section 7 so as to confirm the designated figure or the closed region inside the ear (ST23). For example, the frame of the closed region inside the ear is display thick.

When there is a plurality of figures subjected to the rainbow-color forming process by the same pattern information D, the above-described operation is repeated every figure to select a figure and select the pattern information D. In ST22, figures subjected to the rainbow-color forming process are selected once. On the other hand, when there is a figure subjected to the rainbow-color forming process by different pattern information D, the operations of ST22 and ST23 are repeated till the selection of all the figures is completed (ST24). When the selection of a figure of a portion subjected to the rainbow-color formation is completed (ST24-Yes), data indicative of the selected figure or the closed region inside the ear is stored in the image memory section 6 (ST25).

When the figure selecting process is completed, a pattern subjected to the rainbow-color formation is selected with respect to the selected figure or the closed region inside the ear (ST12), and the pattern selecting process shown in FIG. 9 is executed. In the pattern selecting process, the pattern information D shown in FIG. 3 previously stored in the control memory portion 5 is displayed on the display section 7 (ST31). Parameters D1 to D3 of the pattern information D displayed on the display section 7 are selected and designated by the selecting means 4a of the manual input section 4 (ST32).

For example, in the pattern information D shown in FIG. 3, the third line width and the first spacing are selected and designated as the pattern shape D1. As the line kind D2, the parallel solid line is selected and designated. As the color D3, black is selected and designated.

When the parameters D1 to D3 of the pattern information D are selected and designated, the pattern selecting means 8b changes the display expression on the display section 7 so as to confirm the designated parameters D1 to D3 (ST33). For example, the outer frames of the designated parameters D1 to D3 are displayed thick.

When all the parameters D1 to D3 of the pattern information D are selected in a manner as described, data of the parameters D1 to D3 are stored in the image memory section 6.

When the pattern information selecting process is completed, the designated region of the figure according to the pattern information D selected and designated is developed, and the pattern developing process shown in FIG. 10 is executed. In the pattern developing process, as shown in FIG. 5 (b), the pattern developing means 8c writes the pattern on the basis of the selected pattern information D in a memory work area for one image plane portion of the display section 7 (ST41). Then, as shown in FIG. 5 (c), the selected figure is placed in the work area (ST42). In this state, The logic calculating means 8d takes the logic product of all the data in the closed region of the figure and the pattern of the work area (ST43). Then, the pattern obtained by the logic product is written in the frame of the original figure (ST44).

This will be described further. A developed figure and a pattern are expressed as binary data of [0] and [1]. In the example, all the data within a closed region inside the ear in the form of a developed figure and other portions are processed as [1] and [0], respectively. Further, a portion in which a pattern on the basis of the pattern information D is present and a portion in which it is not present are processed as [1] and [0], respectively. The logic product of the developed figure and the pattern expressed by [0] and [1], respectively are taken to thereby obtain a figure (FIG. 5 (d)) in which a pattern is present within the closed region inside the ear. The figure obtained by the logic product is written into the frame of the original figure (the original image). Thus, a figure shown in FIG. 5 (e) is obtained.

The rainbow-color forming process is repeated till the designation of all the figures subjected to the rainbow-color formation is completed. If the rainbow-color forming process is completed (ST14-Yes) and the preparation of output data is not completed (ST3-No), the operations of ST1, ST2 and ST3 are repeated. If the preparation of output data including the rainbow-color forming process is completed (ST3-Yes), the output data are transferred to the printing/stencil making apparatus 3. The printing/stencil making apparatus 3 prints an image (FIG. 5e) on the basis of the output data transferred on the color image forming sheet 11.

Thereby, in the example in which a figure subjected to the rainbow-color formation in the rainbow-color forming process mode, a figure shown in FIG. 5 (e) is printed on the color image forming sheet 11. As a result, the closed region of inside ear is subjected to the rainbow-color forming process into a desired color by color designated of the pattern information D and an image of a mouse is printed on the color image forming sheet 11 (FIG. 5 (f)).

According to the aforementioned embodiment, when a suitable portion of an original image is designated in point and a pattern of the thus point-designated portion is selected, a part of a color area of a plurality of colors of the color image forming sheet 11 corresponding to the point-designated portion is covered with the pattern. Therefore, a desired image subjected to the rainbow-color forming process by a mixture of colors not concealed can be directly printed on the color image forming sheet 11.

The rainbow-color forming process is automatically carried out by the mere operation for point-designating an area of an image subjected to the rainbow-color forming process on the display image plane of the display section 7 to select the pattern information D, and the conventional cumbersome work can be considerably reduced. Thereby, a burden imposed on an operator can be relieved, and the whole processing time can be shortened. Moreover, the consumption quantity of materials such as copy sheets, screen base sheets or the like can be lessened.

In carrying out the rainbow-color forming process, the pattern shape D1, the line kind D2 and the color D3 in the pattern information D are suitably selected, with respect to the designated region of the image, according to the line width and the spacing of color areas of the color image forming sheet 11, whereby the kinds of colors formed on the color image forming sheet 11 is increased, and the expression of colors depicted on the color image forming process 11 can be enhanced.

Incidentally, while in the operation of the image forming apparatus described above, a description has been made of the case where an image is directly printed on the color image forming sheet 11 according to the output data obtained by the rainbow-color forming process, it is to be noted that an image on the basis of the output data is processed by heat-sensitive perforation into a stencil sheet by the printing/stencil making apparatus 3.

The stencil sheet used herein comprises a screen master comprising an adhesive laminate of a screen such as nylon, tetron or the like as a porous tissue and a thermoplastic synthetic resin film such as polyester, polypropylene, a vinylidene chloride copolymer or the like, and a frame comprising a thick paper or synthetic paper, plastics, a thin metal sheet or the like attached to an outer peripheral portion of a thermoplastic synthetic resin film after the heat-sensitive processing.

As the processing/printing apparatus 3, a stencil printing machine is used. In the printing/stencil making apparatus 3, when the stencil making mode is selected by the selecting means 4a of the manual input section 4, an image on the basis of output data transferred from the processor 2 is subjected to heat-sensitive perforation from the side of the thermoplastic synthetic resin film of the stencil sheet with respect to the stencil sheet set to a predetermined position. Thereby, an image of a desired pattern is perforated to a predetermined position of the stencil sheet. At this time, a perforated image can be formed directly on the stencil sheet without using a film sheet of white stripes, copying operation, a flash lamp and the like so far used.

By using the perforated stencil sheet, an image is printed on the color image forming sheet 11 by a stencil printing machine not shown. More specifically, a frame formed with an impervious transparent film is affixed to a porous tissue of the stencil sheet to form a stencil sheet frame, an ink of a desired color is supplied onto the stencil sheet, and after this, said sheet is mounted on the stencil printing machine and pressed toward the color image forming sheet 11 whereby the ink passes through the bored portion of the stencil sheet and is transferred to the color image forming sheet 11 and printed. If the output data transferred from the processor 2 is one subjected to the rainbow-color forming process, printing by a desired pattern selected by the manual input section 4 is applied to an area of the color image forming sheet 11 corresponding to the designated portion of an original image by the manual input section 4. A part of a color area of a plurality of colors of the color image forming sheet 11 corresponding to the point-designated portion is covered with a pattern, and a printed matter subjected to the rainbow-color forming process by a mixture of colors not concealed is made.

Incidentally, while in the above-described embodiment, the pattern directly printed on the color image forming sheet 11 or the pattern perforated on the stencil sheet comprises lines such as solid lines or broken line with stripes, it is to be noted that the pattern may be dots. In this case, the shape of color areas of the color image forming sheet 11 can be formed from dots. The shape of dots may be a fine circle and a polygon or the like. The kinds of colors can be increased by changing the center spacing of dots and tone.

The spacing of the pattern is widely set with respect to the spacing of colors of the color image forming sheet 11 previously formed regularly. However, in the case where line widths and spacings of colors, line widths of a pattern of the color image forming sheet 11 are constant, the spacing between the rainbow-color layers changes according to the difference of spacings of the pattern. For example, suppose that both the line width and spacing of color areas of the color image forming sheet 11 are 0.2 mm, and the line width of a pattern is 0.2 mm, the spacing of the rainbow-color layer obtained is coarse in 0.6 mm and fine in 0.8 as compared with 0.6 mm and 0.8 mm of the spacing of the pattern.

Further, in the case where the line width and spacing, and the spacing of the pattern of color areas of the color image forming sheet 11 are constant, the concentration of the rainbow-color layer changes according to the difference of the line width of the pattern. For example, suppose that both the line width and spacing of color areas of the color image forming sheet 11 are 0.2 mm, and the spacing of a pattern is 0.6 mm, the color of the rainbow-color layer obtained is light in 0.1 mm and dark in 0.2 as compared with 0.1 mm and 0.2 mm of the line width of the pattern.

Accordingly, the spacing and the concentration of the rainbow-color layer obtained when printing is applied to the color image forming sheet 11 can be changed by suitably selecting the spacing and the line width of the pattern information D by the manual input section 4.

Further, if the line width and spacing of the pattern are set so that a part or the whole of a determined color area out of color areas of the color image forming sheet 11 is covered, colors appearing on the color image forming sheet 11 are constant. On the other hand, it is possible to take one of the following processing (1) to (3) so that covered portions of color areas of the color image forming sheet 11 are not constant.

(1) The line width and spacing of a pattern are set according to the line width and spacing of color areas of the color image forming sheet 11 so that covered portions of the color areas are not constant.

(2) Patterns are formed to be inclined at a predetermined angle with respect to color areas of the color image forming sheet 11.

(3) Color areas of the color image forming sheet 11 are formed to be inclined at a predetermined angle with respect to the patterns.

In this case, the coating state of color areas by the pattern is not constant but continuously changes in a longitudinal direction of an area. Therefore, more effect occurs, and there can be obtained a rainbow-like color effect in which a plurality of colors continuously appear on the color image forming sheet 11.

As described above, the mode of a pattern directly printed on the color image forming sheet 11 or a pattern processed onto the stencil sheet will suffice if a natural mixed color or a rainbow color is obtained when observed by naked eyes.

According to the image forming methods of the first and seventh aspects according to the present invention, a suitable portion of an original image can be subjected to the rainbow-color forming process to directly print a desired image on the color image forming sheet.

According to the image forming methods of the second and eighth aspects according to the present invention, a suitable portion of an original image is subjected to the rainbow-color forming process to perforate a desired image onto a stencil sheet. The stencil sheet is used to apply printing to the color image forming sheet whereby a printed matter can be obtained in which an area of the color image forming sheet corresponding to a designated portion is subjected to the rainbow-color forming process.

Since the rainbow-color forming process is automatically carried out by the mere operation for designating an area of an image subjected to the rainbow-color forming process on a display image plane to select pattern information, the conventional cumbersome work can be considerably reduced. As a result, a burden imposed on an operator is relieved, and the whole processing time can be shortened. Moreover, the consumption quantity of materials such as copying sheets, screen base sheets and the like can be reduced as compared with prior art.

Further, in the rainbow-color forming process, pattern information comprising pattern shapes, line widths, line kinds and colors are suitably selected according to line widths and spacings of color areas of the color image forming sheet with respect to the designated region of an image, whereby the kinds of colors formed on the color image forming sheet, and the expression of colors depicted on the color image forming sheet can be enhanced.

What is claimed is:

1. An image forming apparatus for forming a color printed image on a color image forming sheet provided with a color area comprising plural kinds of colors arranged in a predetermined pattern, comprising:

display means for displaying an image, said display means displaying plural kinds of pattern information, area designating means for designating an area of at least a part of said image displayed on said display means, an interior of said area designated by said area designating means being designated by a desired pattern selected from the pattern information in the display means, and printing means for printing said image on said color image forming sheet so that the area designated by said area designating means appears as a designated pattern on the color area of said color image forming sheet.

2. An image forming apparatus for forming a color printed image using a perforated stencil sheet on a color image forming sheet provided with a color area comprising plural kinds of colors arranged in a predetermined pattern, comprising:

display means for displaying an image, said display means displaying plural kinds of pattern information, area designating means for designating an area of at least a part of said image displayed on said display means, an interior of said area designated by said area designating means being designated by a desire pattern selected form the pattern information in the display means, and perforating means for perforating said image on said stencil sheet so that the area designated by said area designating means appears as a designated pattern on the stencil sheet for printing the image on the color area of said color Image forming sheet.

3. An image forming apparatus according to claim 1, wherein said pattern information comprises information of a line width of a stripe, a spacing of a stripe, a line kind, and color.

4. The image forming apparatus according to claim 1, further comprising control means for processing image data according to a pattern designated out of said pattern information.

5. An image forming apparatus according to claim 4, wherein said control means comprises:

pattern developing means for setting a memory work area for one image plane in a designated pattern out of said pattern information to place a figure representative of an external form of the region designated by said area designating means in said memory work area, and logical operating means for writing in said image a figure of said designated region placed in said memory work area by said pattern developing means and a figure obtained by the logic product relative to said designated pattern.

6. An image forming method for forming a desired color printed image on a color image forming sheet provided with a color area comprising plural kinds of colors arranged in a predetermined pattern, said method comprising each steps of;

displaying an image data, and plural kinds of pattern information, designatng an area in said image, an interior of said area being designated so that said area is expressed with a desired pattern selected from the pattern information, and printing said image onto said color image forming sheet.

7. An image forming method for forming a desired color printed image using a perforated stencil sheet on a color image forming sheet provided with a color area comprising plural kinds of colors arranged in a predetermined pattern, said method comprising steps of;

displaying an image, and plural kinds of pattern information, designating an area in said image, designating an interior of the area in said image so that said area is expressed with a desired pattern selected from the pattern information, and perforating said image onto said stencil sheet.

8. An image forming apparatus for forming a color printed image on a color image forming sheet provided with a color area comprising plural kinds of colors arranged in a predetermined pattern, comprising:

display means for displaying an image, area designating means for designating an area of at least a part of said image displayed on said display means, pattern selecting means containing plural kinds of pattern information, a desired pattern being selected from the pattern information and assigned in the area defined in the area designating means, and printing means for printing said image on said color image forming sheet so that the area designated by said area designating means appears as a designated pattern on the color area of said color image forming sheet.

9. An image forming apparatus for forming a color printed image using a perforated stencil sheet on a color image forming sheet provided with a color area comprising plural kinds of colors arranged in a predetermined pattern, comprising:

display means for displaying an image, area designating means for designating an area of at least a part of said image displayed on said display means, pattern selecting means containing plural kinds of pattern information, a desired pattern being selected from the pattern information and assigned in the area defined in the area designating means, and perforating means for perforating said image on said stencil sheet so that the area designated by said area designating means appears as a designated pattern on the color area of said color image forming sheet.

* * * * *